UNITED STATES PATENT OFFICE.

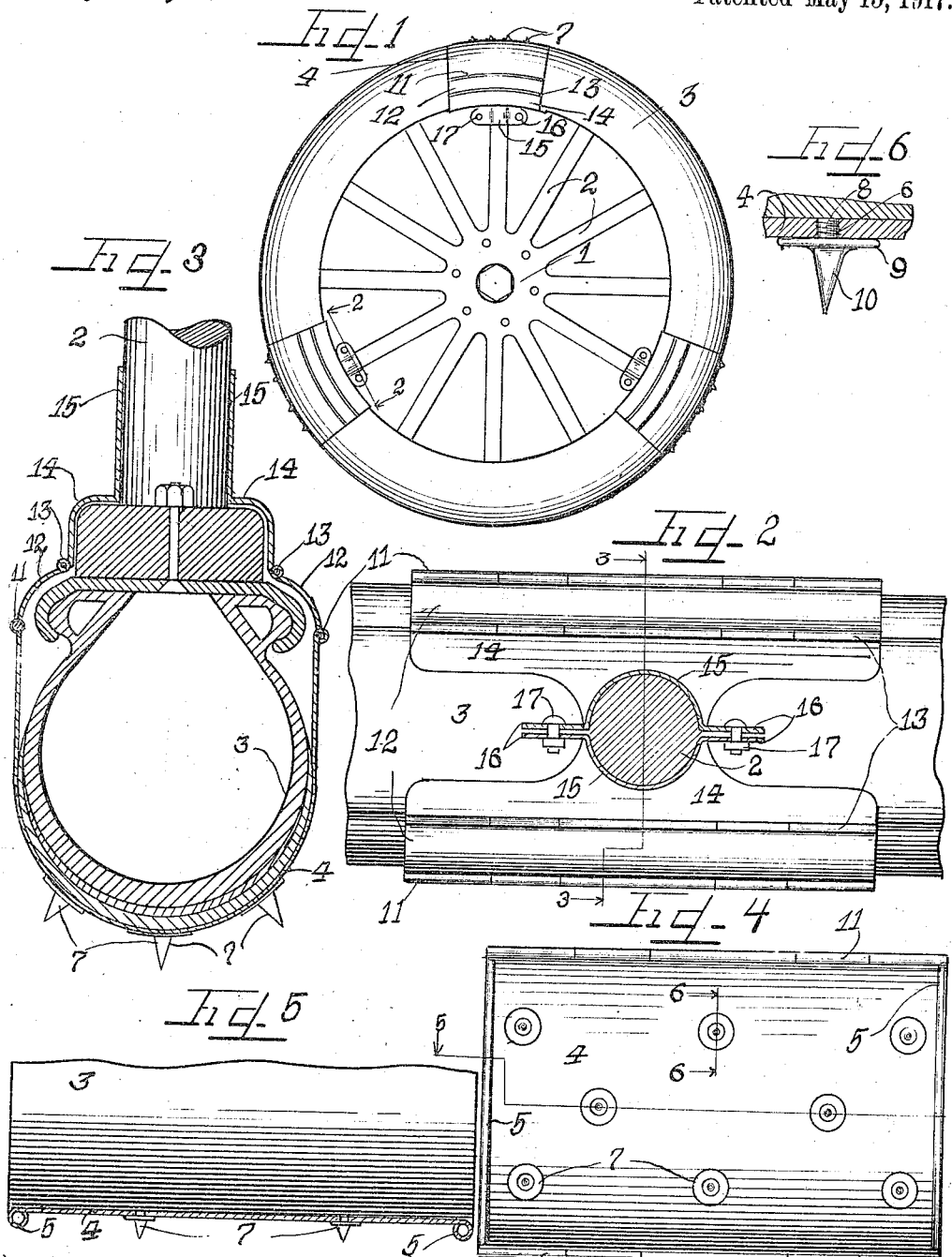

JAMES F. BAXA, OF CHICAGO, ILLINOIS.

ANTISKIDDING DEVICE.

1,226,171. Specification of Letters Patent. Patented May 15, 1917.

Application filed April 12, 1916. Serial No. 90,552.

*To all whom it may concern:*

Be it known that I, JAMES F. BAXA, a citizen of the United States, and a resident of the city of Chicago, in the county of Cook and State of Illinois, have invented certain new and useful Improvements in Antiskidding Devices; and I do hereby declare that the following is a full, clear, and exact description of the same, reference being had to the accompanying drawings, and to the numerals of reference marked thereon, which form a part of this specification.

With the use of pneumatic and solid rubber tires for vehicles, difficulties have been encountered due to the fact that on muddy roads and on wet city pavements there is a marked tendency for the tires to skid, often resulting in damage not only to the vehicle itself but also endangering persons riding in the same. Numerous types of non-skid tires have been placed upon the market designed to reduce and eliminate the skidding effect, but tires of this type are not only expensive but in a comparatively short time wear to such an extent that they no longer are capable of performing their function.

This invention, however, relates to an improved skid preventing device which may be associated with a vehicle wheel and tire, requiring but little trouble to attach or remove the same, and effectively acting to prevent skidding of a vehicle to which the device is attached.

It is an object of this invention to construct an anti-skidding device easily attachable to and removable from the tire and wheel of a vehicle.

It is also an object of this invention to construct a resilient sectional anti-skidding device adapted to be detachably engaged around a tire and adapted to permit movement of the tire therein.

It is also an object of this invention to construct a flexible anti-skid device for vehicles adapted to be removably engaged around a tire and secured to the spokes of a wheel.

It is a further object of this invention to construct a flexible non-skidding device for vehicles consisting of hingedly connected sections adapted to fit around the tire of a vehicle wheel, and provided with outwardly projecting members to contact with the road over which the vehicle is traveling to prevent skidding.

It is furthermore an object of this invention to construct a non-skidding device for wheels comprising hingedly connected resilient metal sections adapted to fit around the tire of a vehicle wheel and having clamping members to removably secure the device to the wheel, one of said sections being provided with removable outwardly projecting members adapted to contact the road or pavement to prevent skidding of the wheel thereon.

It is finally an object of this invention to construct a flexible resilient anti-skidding device for vehicle wheels, simple and of durable construction, readily attached on or removed from a vehicle wheel.

The invention (in a preferred form) is illustrated in the drawings and hereinafter more fully described.

In the drawings:

Figure 1 is a conventional side view of a vehicle wheel equipped with devices embodying the principles of my invention.

Fig. 2 is an enlarged detailed sectional view taken on line 2—2 of Fig. 1.

Fig. 3 is an enlarged detailed section taken on line 3—3 of Fig. 2, with parts shown in elevation.

Fig. 4 is a bottom plan view of the device.

Fig. 5 is a section taken on line 5—5 of Fig. 4, with parts shown in elevation.

Fig. 6 is a fragmentary detailed section taken on line 6—6 of Fig. 4, with parts shown in elevation.

As shown on the drawings:

The reference numeral 1, designates as a whole a vehicle wheel, having spokes 2, and a rubber tire 3, detachably mounted upon the rim of the wheel in any suitable manner. The anti-skidding device comprises a flexible resilient metal U-shaped section 4, both ends of which are rolled outwardly to form beads 5, to prevent the ends of the device cutting into the tire of the wheel. Said section 4, is also provided with a plurality of staggered threaded apertures 6, in the outer curved portion of the section 4, adapted to have removably threaded therein non-skid members, projections or pins 7, each comprising a threaded shank 8, having integrally formed on one end thereof a collar 9, which has integrally formed therebeyond a centrally disposed and outwardly projecting tapered projection or spike 10, as clearly shown in Fig. 6.

Movably secured to the side margins of said U-shaped section 4, by means of hinges 11, are curved rim plates 12, upon each of which is movably mounted by means of a hinge 13, a second curved felly plate 14, recessed at each end and each provided with a centrally disposed integral clamping member 15, having an apertured extension or flange 16, formed on each end thereof adapted to receive a bolt 17, engaging the adjacent flange of the opposite clamp, therethrough, to permit the clamps 15, to be detachably secured on one of the spokes 2, of the wheel for holding the device securely in position.

As shown in Fig. 1, any desired number of anti-skidding devices may be attached upon a vehicle wheel, and each device may be provided with one or more sets of clamping members according to the length of the device.

The operation is as follows:

When the use of anti-skidding devices becomes necessary on account of slippery roads, the U-shaped section 4, is placed around the tire of a wheel with the plates 12 and 14, fitting around the wheel rim and felly of the wheel respectively. The clamping members 15, are then in position to engage around one of the spokes 2, and may be tightly secured thereto by means of the bolts 17, which fit through the apertures provided for the purpose in the flanges 16, as clearly shown in Fig. 2.

The non-skid members 7, may be threaded into the apertures 6, of the section 4, either before or after the device is connected on the wheel, the collars 9, being of sufficient diameter to form a good bearing surface upon the outer surface of the section 4, to prevent the spikes 10, from working their way inwardly and damaging the tire. The non-skid members 7, are made removable so that the same may be replaced when worn or broken, and also to permit replacement of the same by non-skid members having different shaped spikes 10, designed with sharper or blunter points or of any desired length adaptable for use upon different kinds of roads.

Due to the resilient construction of the metal section 4, and the hingedly connected curved plates 12 and 14, the device readily adapts itself to conform to any change in the shape of the tire, due to any causes whatsoever.

It will, of course, be understood that the device may be provided with any number of clamping members according to the length thereof, and that the various sections, plates and parts of the device may be varied through a wide range without departing from the principles of this invention. I therefore do not purpose limiting the patent granted otherwise than necessitated by the prior art.

I claim as my invention:

In a device of the class described, a U-shaped section, rim plates hingedly connected thereto, a curved felly plate connected to each of said plates, and clamping means integral with said felly plates and adapted to be secured removably to a spoke of a wheel to hold the device in position.

In testimony whereof I have hereunto subscribed by name in the presence of two subscribing witnesses.

JAMES F. BAXA.

Witnesses:
  CHARLES W. HILLS, Jr.,
  EARL M. HARDINE.